US011201970B2

(12) United States Patent
Nishizawa et al.

(10) Patent No.: US 11,201,970 B2
(45) Date of Patent: Dec. 14, 2021

(54) SYSTEM, APPARATUS AND COMPUTER PROGRAM PRODUCT FOR DETECTING IMAGE DEFECTS BASED ON ANGLES OF RESPECTIVE VECTORS OF A PLURALITY OF PIXELS AND REFERENCE COLORS

(71) Applicant: CANON KABUSHIKI KAISHA, Tokyo (JP)

(72) Inventors: Yuki Nishizawa, Kanagawa (JP); Kuniaki Kasuga, Shizuoka (JP); Hiroyuki Yamazaki, Shizuoka (JP); Yoshitaka Zaitsu, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/219,516

(22) Filed: Mar. 31, 2021

(65) Prior Publication Data

US 2021/0337072 A1 Oct. 28, 2021

(30) Foreign Application Priority Data

Apr. 24, 2020 (JP) .............................. JP2020-077590

(51) Int. Cl.
*H04N 1/00* (2006.01)
*H04N 1/50* (2006.01)

(52) U.S. Cl.
CPC ..... *H04N 1/00031* (2013.01); *H04N 1/00015* (2013.01); *H04N 1/00023* (2013.01); *H04N 1/00037* (2013.01); *H04N 1/00045* (2013.01); *H04N 1/00068* (2013.01); *H04N 1/00795* (2013.01); *H04N 1/50* (2013.01)

(58) Field of Classification Search
None
See application file for complete search history.

(56) References Cited

U.S. PATENT DOCUMENTS

| 7,097,270 | B2 | 8/2006 | Yamazaki | 347/19 |
| 8,786,907 | B2 | 7/2014 | Yamazaki | 358/3.06 |
| 2011/0299862 | A1 | 12/2011 | Kozuka | 399/19 |

FOREIGN PATENT DOCUMENTS

| JP | 2005-045585 | | 2/2005 |
| JP | 2007-274204 | | 10/2007 |
| JP | 4517651 B | | 8/2010 |
| JP | 2012-011769 | | 1/2012 |
| JP | 2021016996 A | * | 2/2021 |

* cited by examiner

*Primary Examiner* — Scott A Rogers
(74) *Attorney, Agent, or Firm* — Venable LLP

(57) ABSTRACT

An image forming system includes: a reading unit configured to read a test image, the test image having a determination image formed by overlapping a plurality of colors and a plurality of reference images formed with each of a plurality of reference colors; and a determination unit configured to determine a first color value of each of the plurality of reference colors based on a reading result of the reference images, determine a second color value of a plurality of pixels included in the determination image based on a reading result of the determination image, and determine whether an image defect has occurred based on an angle of a second vector corresponding to the second color value of the plurality of pixels with respect to a first vector corresponding to the first color value of each of the plurality of reference colors.

17 Claims, 12 Drawing Sheets

FIG. 6A

|   | YELLOW | MAGENTA | CYAN | BLACK | BACKGROUND REGION |
|---|---|---|---|---|---|
| R | 255 | 236 | 0 | 38 | 239 |
| G | 212 | 0 | 156 | 36 | 236 |
| B | 0 | 140 | 209 | 37 | 237 |

FIG. 6B

|   | YELLOW | MAGENTA | CYAN | BLACK | BACKGROUND REGION |
|---|---|---|---|---|---|
| L* | 87.7 | 54.3 | 68.8 | 41.4 | 91.0 |
| a* | -6.3 | 77.1 | -36.9 | 0.9 | -0.2 |
| b* | 99.7 | -30.9 | -22.8 | 1.9 | 4.2 |

FIG. 6C

|   | YELLOW | MAGENTA | CYAN | BLACK |
|---|---|---|---|---|
| L* | -3.3 | -36.7 | -22.2 | -49.6 |
| a* | -6.2 | 77.3 | -36.7 | 1.0 |
| b* | 95.6 | -35.0 | -27.0 | -2.3 |

FIG. 6D

|   | YELLOW | MAGENTA | CYAN | BLACK |
|---|---|---|---|---|
| L* | -0.034 | -0.397 | -0.437 | -0.999 |
| a* | -0.064 | 0.836 | -0.724 | 0.021 |
| b* | 0.997 | -0.379 | -0.533 | -0.046 |

FIG. 7A

|     | Pb (HIGH DENSITY) | Pb (LOW DENSITY) |
|-----|-------------------|------------------|
| L*  | -0.871            | -0.826           |
| a*  | 0.333             | -0.288           |
| b*  | 0.360             | 0.484            |

FIG. 7B

|                              | Y     | M      | C      | K     |
|------------------------------|-------|--------|--------|-------|
| Pb (HIGH DENSITY)            | 0.367 | 0.488  | -0.052 | 0.860 |
| Pb (LOW DENSITY)             | 0.529 | -0.096 | 0.312  | 0.797 |
| CHANGE AMOUNT (ABSOLUTE VALUE) | 0.16  | 0.58   | 0.36   | 0.06  |

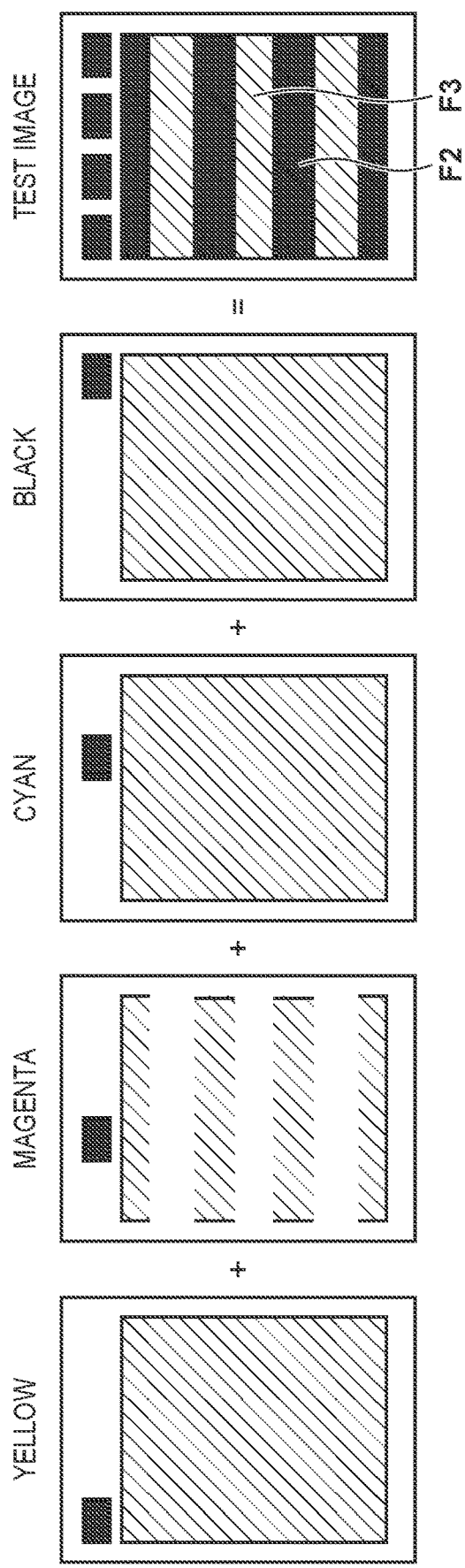

| SIZE | POSITION | |
|---|---|---|
| | X(mm) | Y(mm) |
| 10 | 98 | 15 |
| 11 | 98 | 59 |
| 10 | 98 | 103 |
| 10 | 98 | 147 |
| 10 | 98 | 191 |
| 9 | 98 | 235 |

SYSTEM, APPARATUS AND COMPUTER PROGRAM PRODUCT FOR DETECTING IMAGE DEFECTS BASED ON ANGLES OF RESPECTIVE VECTORS OF A PLURALITY OF PIXELS AND REFERENCE COLORS

BACKGROUND OF THE INVENTION

Field of the Invention

The present invention relates to a technique for determining a defect in an image formed by an image forming apparatus.

Description of the Related Art

Japanese Patent No. 4517651 discloses a configuration that detects degradation of the quality of an image formed, i.e., occurrence of an image defect, and identifies the cause of the image defect by forming a test image in an image forming apparatus and reading the formed test image. Accordingly, it is possible to reduce the downtime, i.e., the time taken by component replacement or the like in order to remove the cause.

For example, various types of image defects may occur due to various causes in a color image forming apparatus that forms images using multi-color toner. Therefore, a low accuracy of identifying the location causing the defect may result in replacing parts that are irrelevant with the cause, thereby extending the downtime. Forming a large number of test images to enhance the accuracy of identifying the location causing the defect consumes a large amount of printing materials and also provides the user with negative impression.

SUMMARY OF THE INVENTION

According to an aspect of the present disclosure, an image forming system includes: a plurality of image forming units corresponding to each of a plurality of colors and configured to form an image of a corresponding color; a reading unit configured to read a test image formed on a printing material by the plurality of image forming units, the test image having a determination image formed by overlapping the plurality of colors and a plurality of reference images formed with each of a plurality of reference colors; and a determination unit configured to determine a first color value in a predetermined color space of each of the plurality of reference colors based on a reading result of the plurality of reference images by the reading unit, determine a second color value in the predetermined color space of a plurality of pixels included in the determination image based on a reading result of the determination image by the reading unit, and determine whether or not an image defect has occurred based on an angle of a second vector corresponding to the second color value of the plurality of pixels with respect to a first vector corresponding to the first color value of each of the plurality of reference colors in the predetermined color space.

Further features of the present invention will become apparent from the following description of exemplary embodiments with reference to the attached drawings.

BRIEF DESCRIPTION OF THE DRAWINGS

FIGS. 6A to 6D are explanatory diagrams of an image defect determination process according to an embodiment;

FIGS. 7A and 7B are explanatory diagrams of an image defect determination process according to an embodiment;

FIG. 8 illustrates an example of a test image formed during occurrence of an image defect;

DESCRIPTION OF THE EMBODIMENTS

Figure 1:
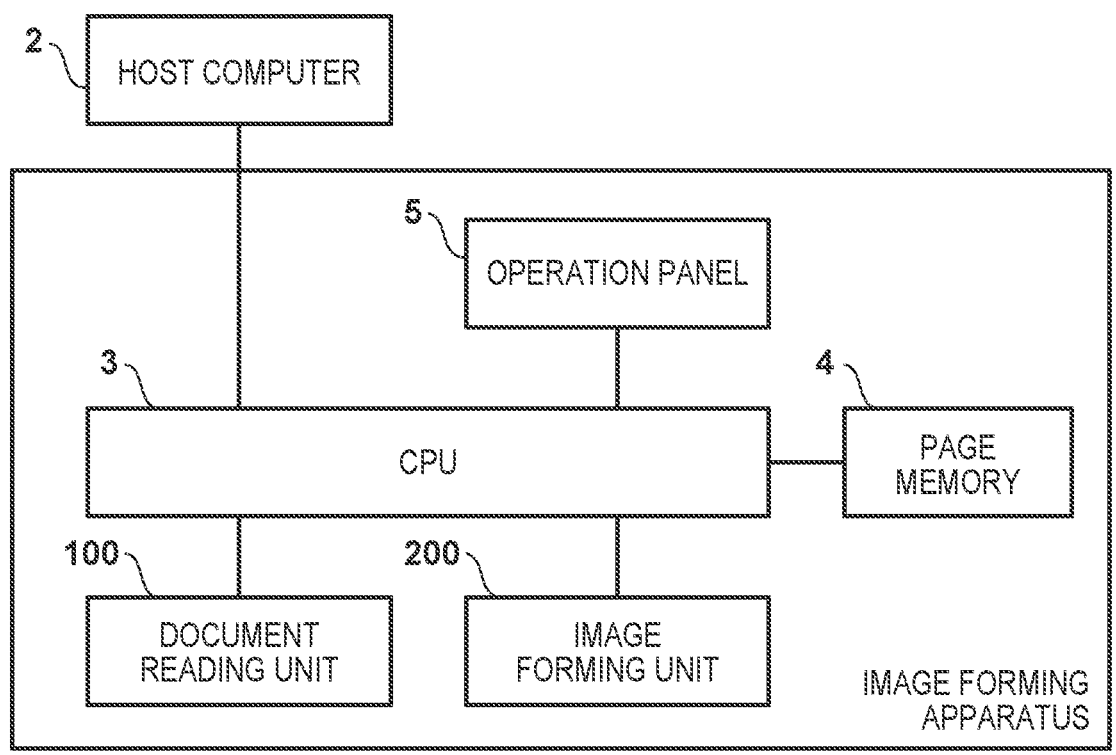
FIG. 1 is a block diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram of an image forming apparatus according to the present embodiment. A CPU 3, upon receiving image data of an image to be formed from a host computer 2, temporarily stores the image data in a page memory 4. The CPU 3 then controls an image forming unit 200 based on the image data stored in the page memory 4 to form an image on a printing material. In addition, the CPU 3 can similarly form an image on a printing material P using the image data read by a document (or image) reading unit 100. An operation panel 5 provides a user interface.

Figure 2:
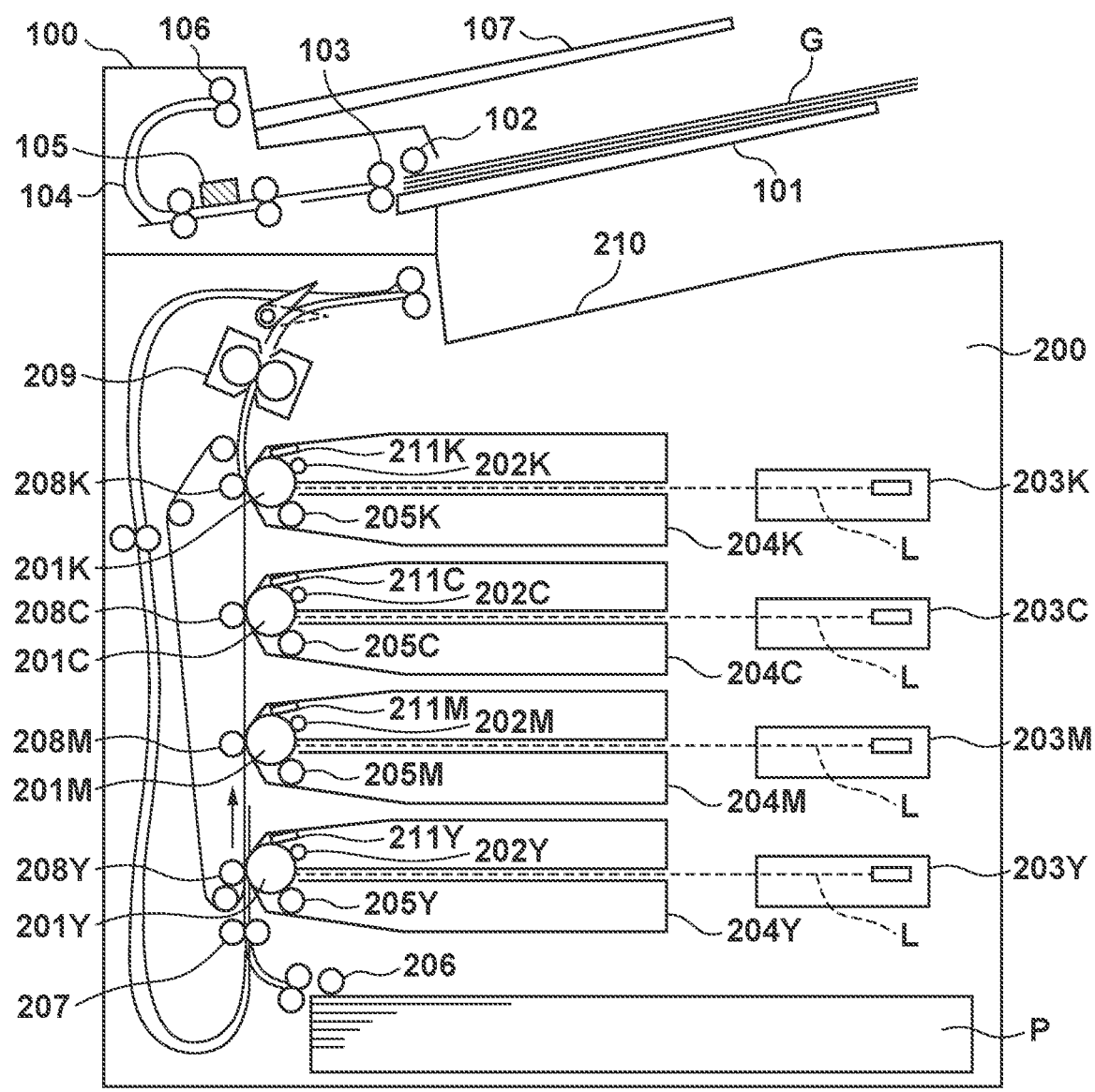
FIG. 2 is a configuration diagram of an image forming apparatus according to an embodiment.

FIG. 2 is a configuration diagram of the document reading unit 100 and the image forming unit 200. A tray 101 of the document reading unit 100 has a document G placed thereon. A feed roller 102 feeds and conveys the document G placed on the tray 101 to a conveyance path 104. On this occasion, a separating roller 103 prevents double feed of the document G. A reading unit 105, having a contact image sensor, optically reads a front image of the document G being conveyed over the conveyance path, and outputs the reading result as image data to the CPU 3. The image data includes information indicating red (R), green (g), and blue (b) components of each pixel in 8 bits (0 to 255), respectively, for example. Subsequently, the document G is discharged to a tray 107 by a discharge roller 106.

The image forming unit 200 forms a full-color image using toner of four colors: yellow (Y), magenta (M), cyan (C), and black (K). In FIG. 2, symbols Y, M, C, and K at the ends of reference numerals indicate that the colors of the toner image formed via involvement of members indicated by the reference numerals are yellow, magenta, cyan, and black, respectively. However, in the following description, when it is not necessary to distinguish colors, reference signs in which the last character is omitted are used. A photoconductor 201 is rotationally driven in a clockwise direction in the drawing during formation of an image. A charge roller 202 charges the surface of the corresponding photoconductor 201 to a uniform potential. An exposure unit 203 scans and exposes the photoconductor 201 with light L modulated in accordance with the image information transmitted from the CPU 3, and forms an electrostatic latent image on the photoconductor 201. A developing roller 205 of a developing unit 204 develops the electrostatic latent image on the photoconductor 201 with toner, and forms a toner image.

On the other hand, a feed roller 206 feeds and conveys the printing material P to the conveyance path. A registration roller 207 conveys downstream the fed printing material P. A transfer roller 208 transfers the toner image of the corresponding photoconductor 201 to the printing material P by outputting a transfer bias voltage. While the printing material P is sequentially traveling through opposing positions of transfer rollers 208Y, 208M, 208C and 208K, yellow, magenta, cyan and black toner images are sequentially transferred to the printing material P. Here, the toner remaining on the photoconductor 201 without being transferred from the photoconductor 201 to the printing material P is removed and collected by a cleaning unit 211. After having the toner image transferred thereon, the printing material P is conveyed to a fixing unit 209. The fixing unit 209 applies pressure and heat to the printing material P to fix the toner image on the printing material P. After having the toner image fixed thereon, the printing material P is discharged to a tray 210. The photoconductor 201, the developing unit 204, the charge roller 202, and the cleaning unit 211 involved in the image formation of the same color are contained in a process cartridge (image forming unit) that is detachable from the main body of the image forming apparatus.

Next, there will be described an example of an image defect generated by failure of a rotating body of the image forming apparatus.

Charge Roller Spot

Figure 3C:
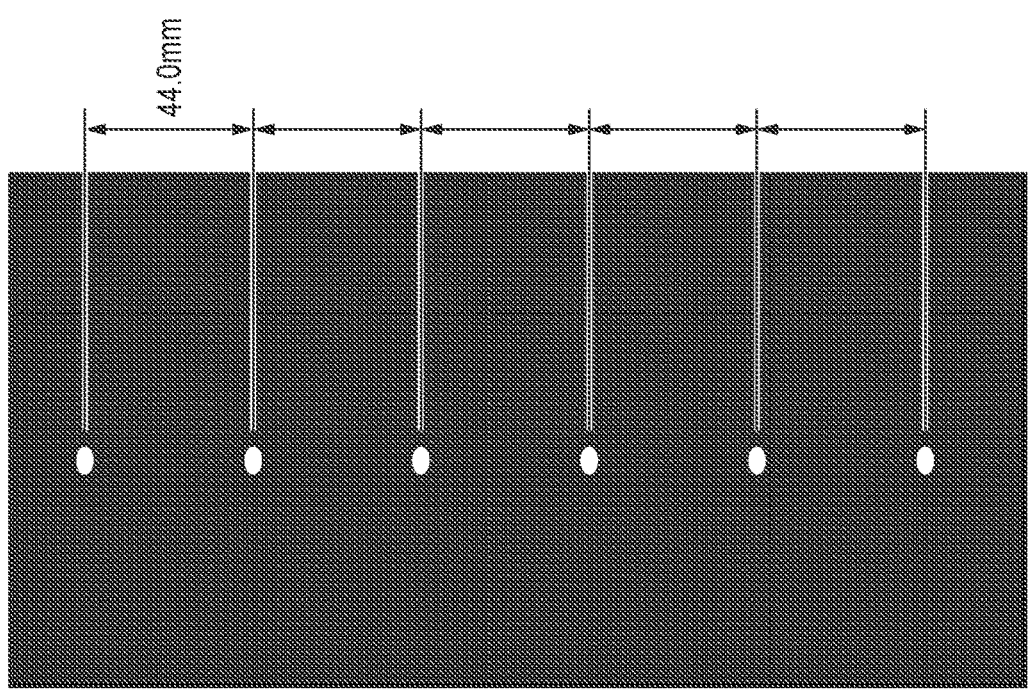
FIGS. 3A to 3C illustrate an example of a periodic image defect.
Figure 3B:
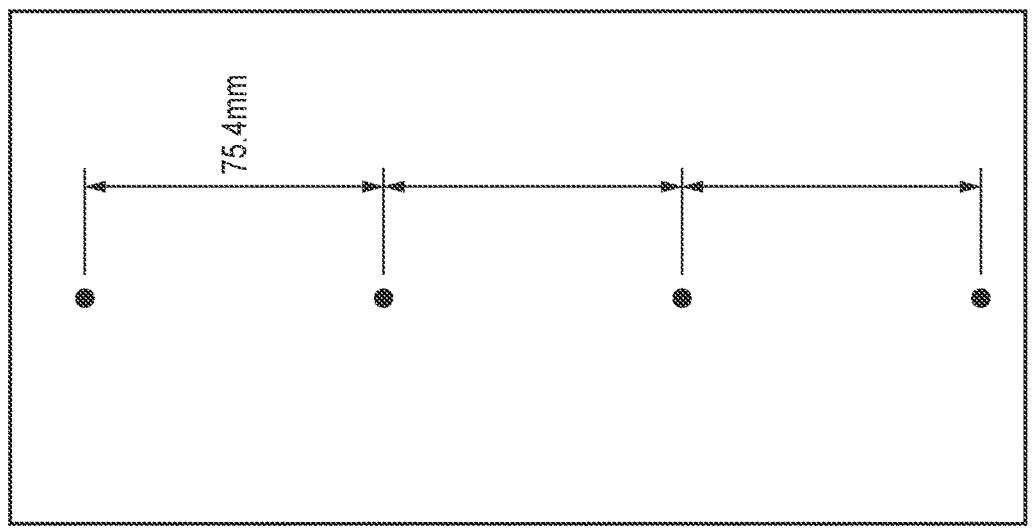
Figure 3A:
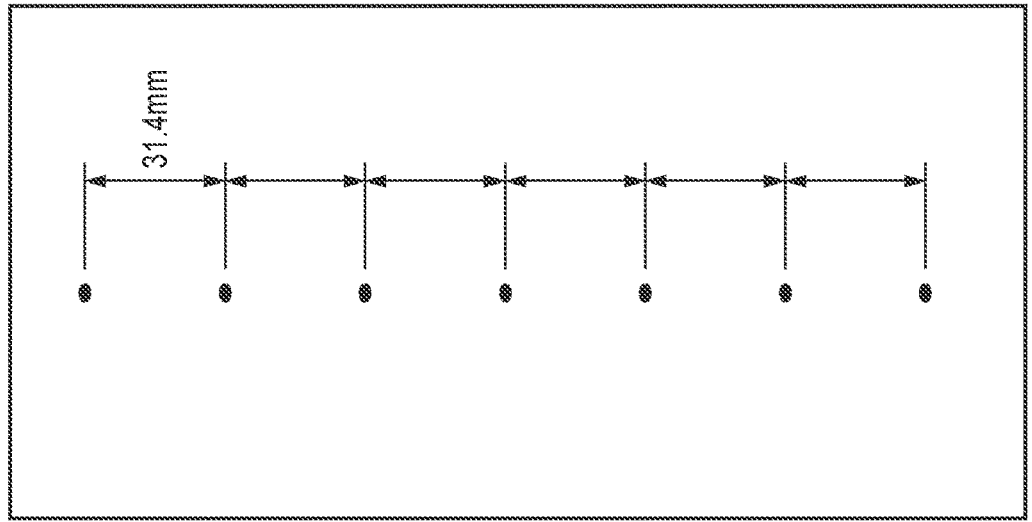

Sticking and accumulation of a foreign material on the charge roller 202 prevents the region with the foreign material sticked thereon from appropriately charging the photoconductor 201. As a result, a black-spot-like image defect occurs. Charged roller spots repeatedly appear at every circumferential length of the charge roller 202. FIG. 3A illustrates a state in which charged roller spots have appeared in a case where the circumferential length of the charge roller 202 is 31.4 mm.

Photoconductor Spot

When a photoconductor layer of the photoconductor 201 peels off and exposes the aluminum base layer, a potential difference between the aluminum and the intact portion causes sticking of toner, whereby a black-spot-like image defect occurs. Photoconductor spots repeatedly appear at every circumferential length of the photoconductor 201. FIG. 3B illustrates a state in which photoconductor spots have appeared in a case where the circumferential length of the photoconductor 201 is 75.4 mm.

Developing Roller Spot

Sticking and accumulation of a foreign material on the developing roller 205 prevents coating of toner only on that part, where a white-spot-like image defect occurs. Developing roller spots repeatedly appear at every circumferential length of the developing roller 205. FIG. 3C illustrates a state in which developing roller spots have appeared in a case where the circumferential length of the developing roller 205 is 44.0 mm.

Figure 4:
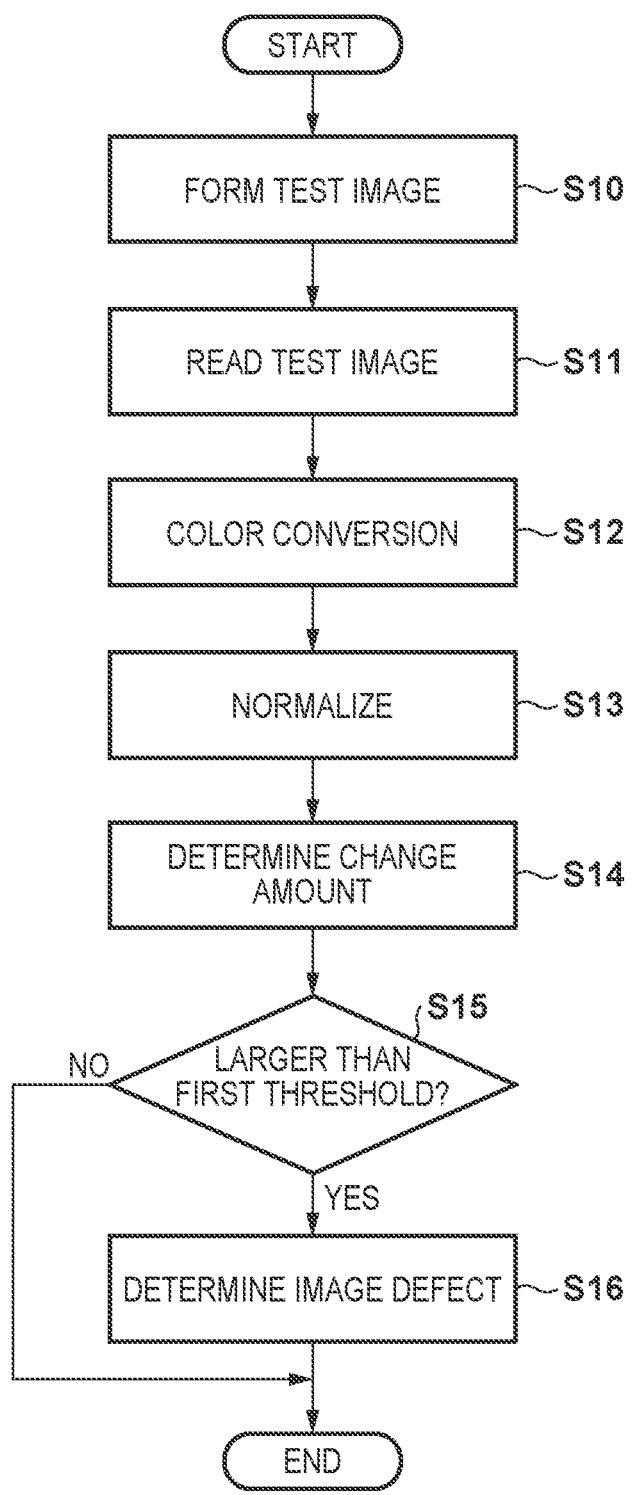
FIG. 4 is a flowchart of an image defect determination process according to an embodiment.
Figure 5:
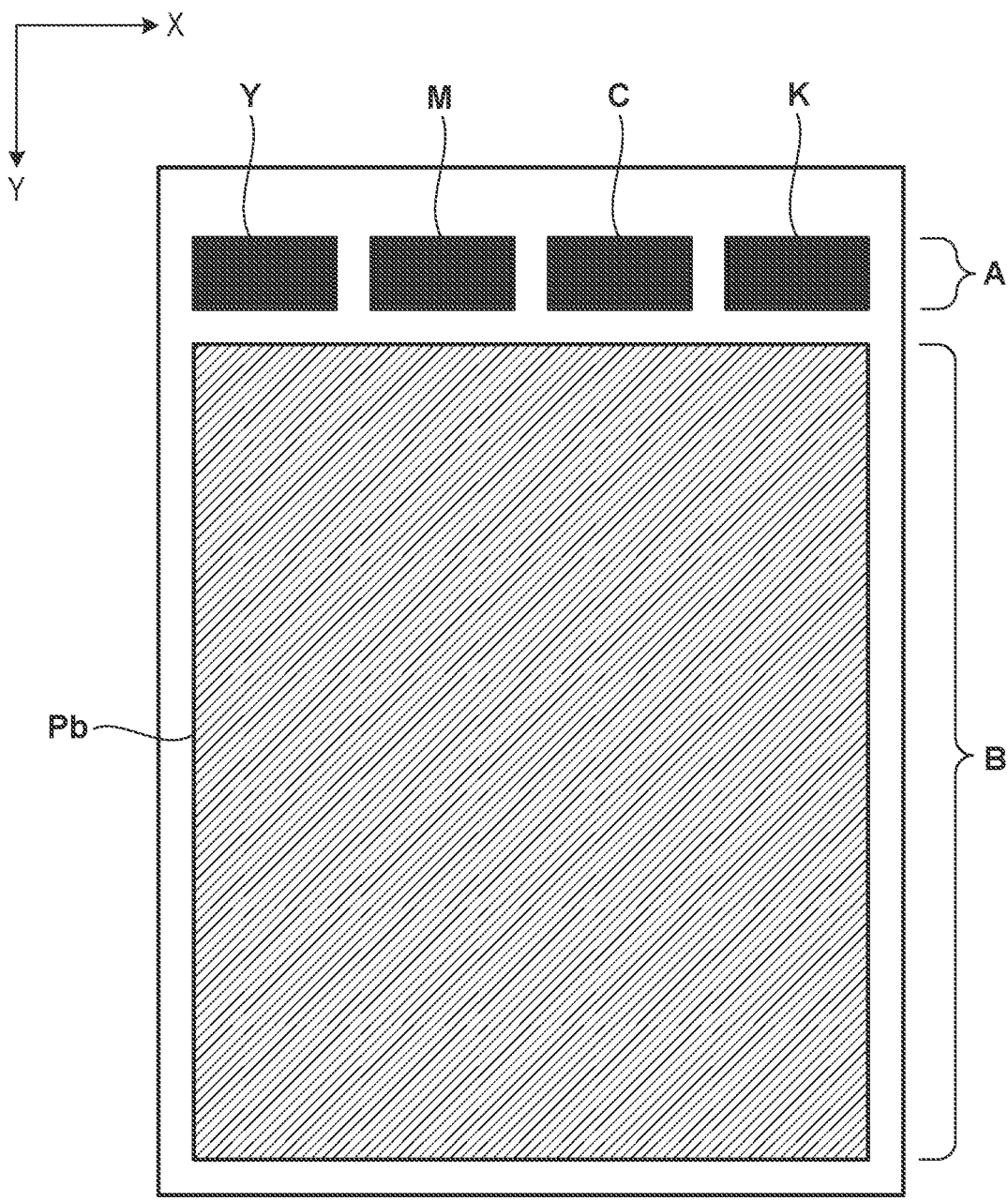
FIG. 5 illustrates a test image according to an embodiment.

FIG. 4 is a flowchart of an image defect determination process according to the present embodiment. The process of FIG. 4 starts in response to, for example, a user's operating the operation panel 5 and instructing the image forming apparatus to inspect image defects. The CPU 3 forms a test image on the printing material P at S10. Image data of the test image is stored in the page memory 4, for example. FIG. 5 illustrates a test image according to the present embodiment. Note that the Y-direction in the present disclosure, which is the conveyance direction of the printing material P, is also referred to as the sub scanning direction. Furthermore, the X-direction in the present disclosure, which is a direction orthogonal to the Y-direction in a plane of the printing material P, is also referred to as the main scanning direction.

The test image has, in a region A thereof, a plurality of reference images formed with each of a plurality of reference colors. In the present embodiment, the plurality of reference colors are assumed to be yellow, magenta, cyan and black, and therefore reference images Y, M, C, and K are formed in the region A. In addition, the test image has, in a region B thereof, a determination image Pb having yellow, magenta, cyan and black overlapped with a density of 10%, respectively. Here, the density of each color is not limited to 10%. The determination image Pb is formed as large as possible. Particularly, the length in the Y-direction is made longer than the maximum value of the circumferential lengths of the respective rotating bodies in the image forming apparatus. For example, as illustrated in FIGS. 3A to 3C, in a case where the circumferential lengths of the charge roller 202, the photoconductor 201, and the developing roller 205 are 31.4 mm, 75.4 mm, and 44.0 mm, respectively, the length of the determination image Pb in the Y-direction is made longer than at least 75.4 mm. More preferably, the length of the determination image Pb in the Y-direction is made longer than three times the maximum value of the circumferential lengths of the respective rotating bodies in the image forming apparatus.

After formation of the test image, the user sets the printing material P bearing the test image on the tray 101 of the document reading unit 100 at S11, and causes the document reading unit 100 to read the printing material P bearing the test image. The document reading unit 100 outputs the read-out image data to the CPU 3. As shown in FIG. 6A, the CPU 3 determines color values in the RGB color space of the reference images Y, M, C, and K, and of a background region in which neither a reference image nor a determination image is formed, and stores the determined color values in a memory (not shown). Here, the color values of the reference images Y, M, C, and K may be a specific pixel in the reference image or the mean of the color values of all or some of the pixels. In addition, the color value of the background region may be the color value of a predetermined pixel of the background region or the mean of the color values of all or some of the pixels.

The CPU 3, at S12, converts the color values in the RGB color space of the reference images Y, M, C, and K, and of the background region acquired at S11 into color values in the L*a*b* color space according to a known method. FIG.

6B shows a result of conversion of the color values shown in FIG. 6A into color values in the L*a*b* color space. Hereinafter, unless explicitly stated to be other color spaces, it is assumed that a "color space" refers to the L*a*b* color space, and a "color value" refers to a color value in the L*a*b* color space. At S13, the CPU 3 subtracts the color value of the background region from the color values of the reference images Y, M, C, and K shown in FIG. 6B. The process corresponds to setting the color value of the background region as the origin of the color space. FIG. 6C shows a value acquired by subtracting the color value of the background region from the color values of the reference images Y, M, C, and K shown in FIG. 6B. At S13, the CPU 3 then normalizes the color values shown in FIG. 6C to a vector of a length 1 in the color space. FIG. 6D shows the result of normalizing the color values of FIG. 6C. Here, the process corresponds to determining a unit vector of each vector in FIG. 6D. Hereinafter, the color values of the reference images Y, M, C, and K shown in FIG. 6D are denoted as the reference vectors of Y, M, C, and K, respectively. Furthermore, the CPU 3 similarly converts the color values in the RGB space of the respective pixels of the determination image Pb read by the document reading unit 100 into color values in the L*a*b* color space, and after having subtracted the color values of the background region, converts the color values into unit vectors. Hereinafter, the unit vectors of the pixels of the determination image Pb are referred to as determination vectors.

Subsequently, at S14, the CPU 3 determines, based on the color values of the respective pixels, a pixel having the highest density in the determination image Pb and a pixel having the lowest density, which can be determined from the image data acquired by reading the determination image Pb. The CPU 3 then calculates the inner product of the determination vector of the pixel with the highest density and the reference vectors of each of Y, M, C, and K, and the inner product of the determination vector of the pixel with the lowest density and the reference vectors of each of Y, M, C, and K. For example, FIG. 7A shows a determination vector of the pixel with the highest density and a determination vector of pixel with the lowest density in the determination image Pb in a case where the test image is formed as illustrated in FIG. 8. In FIG. 8, density unevenness of magenta has occurred in the sub scanning direction, whereby a high-density region F2 and a low-density region F3 have appeared also in the determination image Pb.

FIG. 7B shows the internal product of the determination vector shown in FIG. 7A and the reference vectors of each of Y, M, C, and K. At S14, the CPU 3 determines, for each reference color, the difference (absolute value) between the internal product for the maximum density pixel and the internal product for the minimum density pixel as the change amount, as shown in FIG. 7B. Both the reference vector and the determination vector are unit vectors, and therefore the internal product of the reference vector and the determination vector turns out to be a value that depends on the angle between the reference vector and the determination vector. Accordingly, the change amount shown in FIG. 7B corresponds to the maximum value of the change amounts of angles, with respect to the reference vector, of the determination vectors of each of the plurality of pixels in the determination image Pb. At S15, the CPU 3 determines whether or not all the change amounts are equal to or smaller than a first threshold. Here, the first threshold value may be the same regardless of color, or may be different for each color. When the change amounts of all the colors are equal to or smaller than the first threshold, the CPU 3 determines that there is no image defect and ends the process of FIG. 4. When, on the other hand, there exists a color whose change amount is larger than the first threshold, the CPU 3 determines at S16 that an image defect has occurred. This is because the change amount of the angle of the determination vector with respect to the reference vector of a certain reference color increases in accordance with increase of change of the reference color in the determination image Pb. In addition, the process cartridge related to occurrence of the image defect in this case corresponds to a color whose change amount is larger than the first threshold. The CPU 3 notifies the user of occurrence of the image defect and the process cartridge related to occurrence of the image defect, and ends the process of FIG. 4.

As has been described above, the test image in the present embodiment includes reference images of reference colors, and a determination image of a constant density having respective colors overlapped thereon. The reference colors in the present embodiment are Y, M, C, and K, which are the same as the colors used for image formation. Subsequently, color values of the respective reference images (reference vector) are determined, taking into account the underlying color value of the printing material P. In addition, color values of the maximum density pixel and the minimum density pixel of the determination image Pb (determination vector) are also determined, taking into account the underlying color value of the printing material P. The determination image Pb has a constant density, and therefore the difference between the inner products (angles) of the reference vector of a color and each of the two determination vectors turns out to indicate a change of color value of the color in the determination image. Therefore, a test image formed on a single printing material allows for accurately determining occurrence of an image defect and the color related to occurrence of the image defect, based on the difference between internal products. Particularly, consideration of the underlying color allows for accurate determination regardless of the underlying color of the printing material. In addition, inclusion of the reference image in the test image allows for accurately determining occurrence of an image defect and the color related to occurrence of the image defect, even in a case where the color of the color material of the toner has changed.

Note that, although the reference colors in the present embodiment are assumed to be Y, M, C, and K, which are individual colors used for image formation, other colors may be used as reference colors. For example, blue, green, and red may be used as chromatic reference colors. Here, blue is a subtractive mixed color of magenta and cyan. In addition, green is a subtractive mixed color of yellow and cyan. Furthermore, red is a subtractive mixed color of yellow and magenta. Here, blue is the opposite color of yellow, green is the opposite color of magenta, and red is the opposite color of cyan. In this case, occurrence of density unevenness in magenta, for example, causes a significant change of the internal product with green, which is the opposite color of magenta, whereby it is possible to determine that an image defect has occurred in magenta.

In addition, although, in the present embodiment, it is assumed that the reference vector and the determination vector are unit vectors, it suffices to be able to evaluate the change of the angle between the reference vector and each determination vector, and therefore the present invention is not limited to conversion into unit vectors.

Second Embodiment

Figure 9:
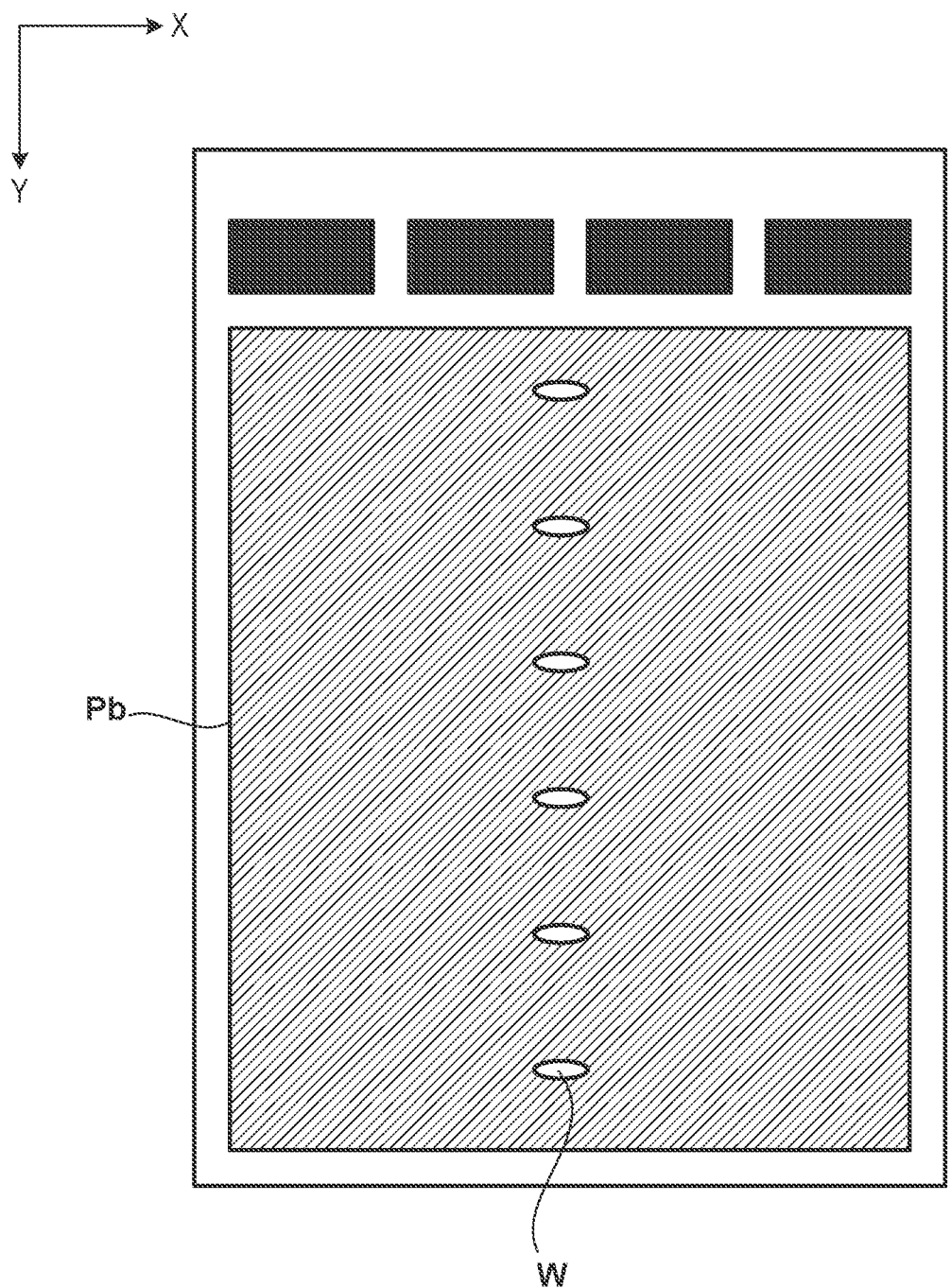
FIG. 9 illustrates an example of a test image formed during occurrence of an image defect.

Next, the second embodiment will be described focusing on differences from the first embodiment. In addition to the color related to occurrence of an image defect, in the present embodiment, the component related to occurrence of the image defect is also determined. FIG. 9 illustrates a test image formed when a developing roller spot is generated in magenta. A periodic color change region W has occurred in the determination image Pb.

Figure 10:
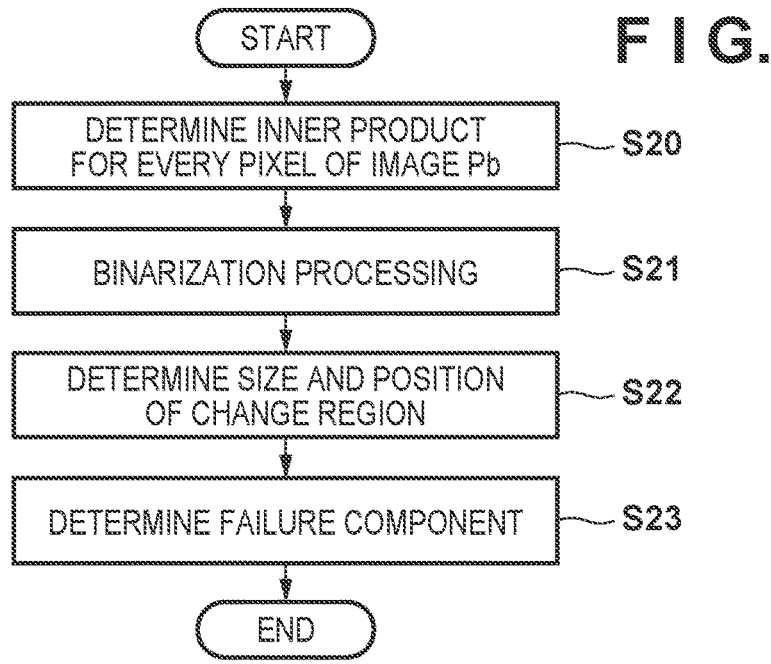
FIG. 10 is a flowchart of image defect determination process according to an embodiment.

FIG. 10 is a flowchart of a failure component identification process according to the present embodiment. Here, the process of FIG. 10 is performed at S16 of FIG. 4. In other words, the process is performed upon determining the color related to occurrence of the image defect. For example, upon occurrence of the image defect illustrated in FIG. 8, the change amount of magenta exceeds the first threshold. In this case, the CPU 3 determines, at S20, an inner product of the determination vector of each pixel of the determination image Pb and the reference vector of M related to occurrence of an image defect. For example, let us assume that the determination image Pb includes 700 pixels in the X-direction and 1050 pixels in the Y-direction. In this case, the CPU 3 calculates internal products for the 700×1050 pixels, respectively.

Figure 11:
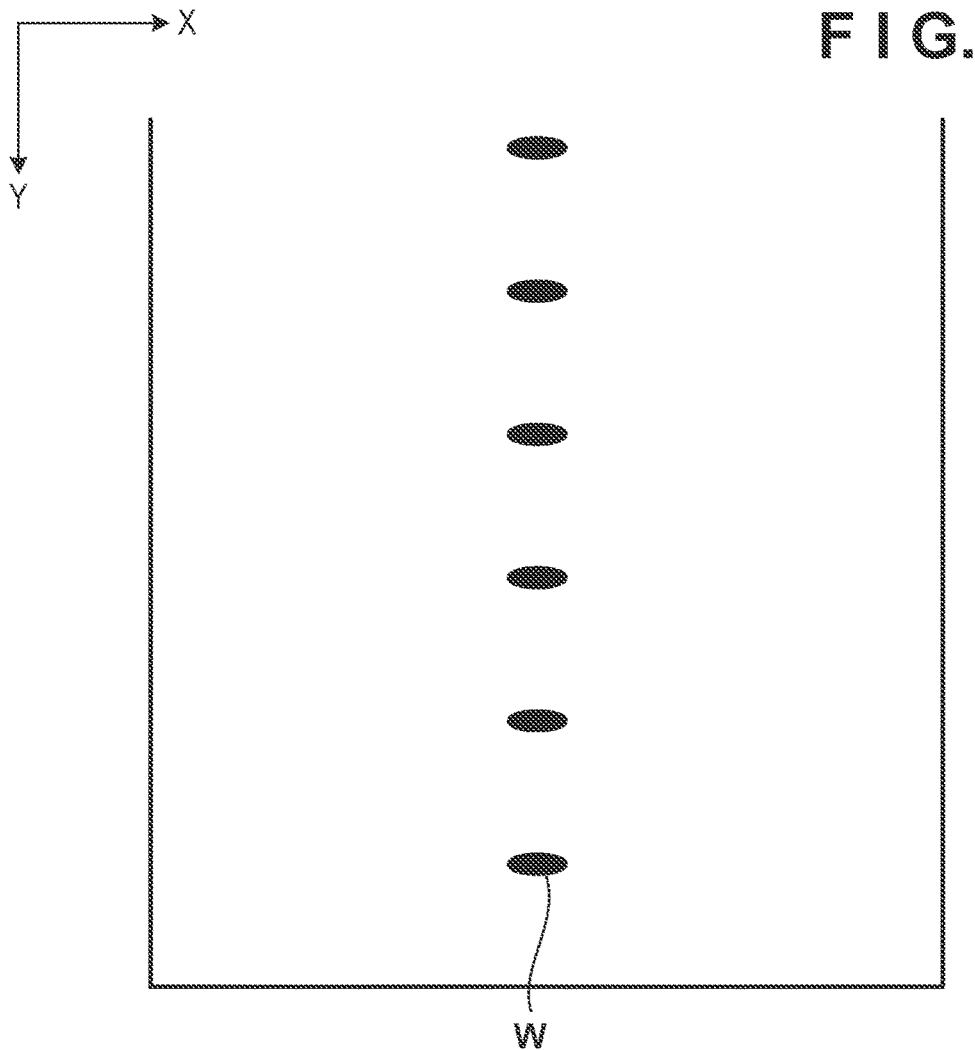
FIG. 11 is an explanatory diagram of an image defect determination process according to an embodiment.

At S21, the CPU 3 binarizes, using a second threshold value, the inner product values calculated at S20 for the respective pixels. Here, the second threshold value may be a predetermined value or the mean of the inner product values for the respective pixels. FIG. 11 is a conceptual diagram of a binarized inner product value. Here, in FIG. 11, the part where the inner product value exceeds the second threshold is indicated by black ovals. Each of the black ovals correspond to the color change region W where the color has changed.

Figures 12, 13:
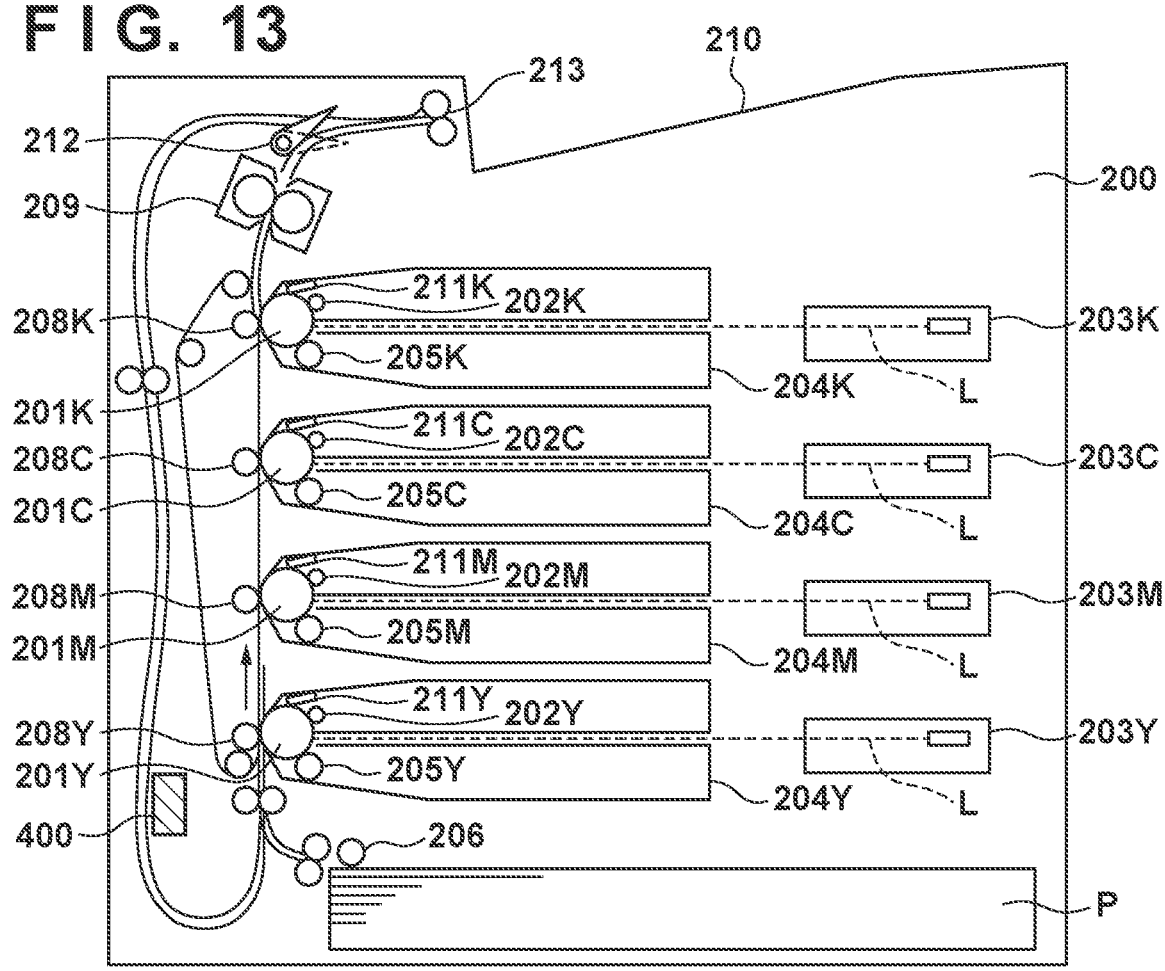
FIG. 12 is an explanatory diagram of an image defect determination process according to an embodiment.
FIG. 13 is a configuration diagram of an image forming unit according to an embodiment.

At S22, the CPU 3 determines a region larger than a threshold, i.e., the size and position of the change region W. The size of the change region W corresponds to the number of pixels included in the change region W. Furthermore, the position corresponds to coordinates in the X-direction and the Y-direction. FIG. 12 illustrates an example of a determination result. In FIG. 12, it can be seen that a substantially equal degree of color change has occurred at an interval of 44 mm in the Y-direction. In the present example, it is the developing roller 205 that causes a color change with a 44-mm period. Accordingly, the CPU 3 can determine at S23 that the magenta developing roller 205 M has failed.

As has been described above, in the present embodiment, the periodicity of the change of the angle between the reference vector and the determination vector is determined for the color related to occurrence of the image defect. In a case of rotating body failure, an image defect occurs at a period in accordance with the circumferential length of the rotating body, and therefore it is possible to accurately determine the rotating body related to occurrence of the image defect, based on the periodicity of the angular change.

Third Embodiment

Next, a third embodiment will be described focusing on differences from the first and second embodiments. In the first and second embodiments, the user, after formation of the test image, is required to set the printing material bearing the test image on the tray 101 of the document reading unit 100, and perform an operation for reading the test image. In the present embodiment, a reading unit 400 is provided on the image forming unit 200 to read the test image.

FIG. 13 illustrates the image forming unit 200 of the image forming apparatus according to the present embodiment. In the present embodiment, the image forming apparatus may or may not have the document reading unit 100. Here, similar components to those already described above are provided with the same referential numerals, with detailed description thereof being omitted. The printing material P having the test image transferred thereon and fixed thereon by the fixing unit 209, is conveyed toward a double-sided conveyance path by setting of a flapper 212 and with rotation in a direction opposite to the discharge direction of the discharge roller 213. The test image on the printing material P is read by the reading unit 400 while being conveyed over the double-sided conveyance path.

As has been described above, in the present embodiment, the reading apparatus 400 is provided in the image forming unit 200, and after a test image is formed on the printing material, it is read by the reading apparatus 400 before discharging the printing material to the outside of the image forming apparatus. The aforementioned configuration allows for saving the user operation of reading the test image.

Fourth Embodiment

Figure 14:
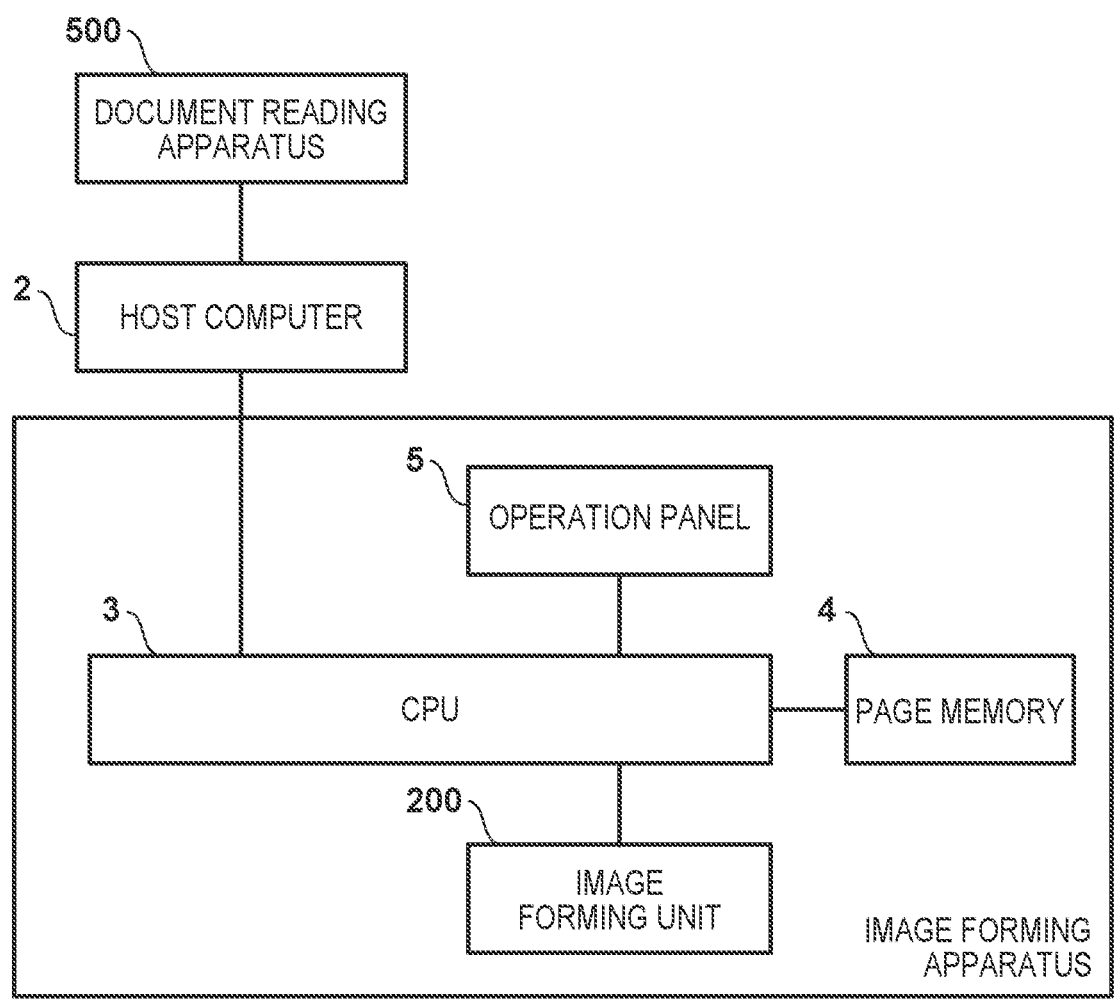
FIG. 14 is a configuration diagram of an image forming system according to an embodiment.

Next, a fourth embodiment will be described, focusing on differences from the first to third embodiments. An image forming apparatus of the present embodiment lacks the document reading unit 100, as illustrated in FIG. 14. Instead, in the present embodiment, a document reading apparatus 500 such as a scanner is connected to the host computer 2. In other words, in the present embodiment, an image forming system including the image forming apparatus, the document reading apparatus 500, and the host computer 2 is provided. Here, the document reading apparatus 500 is configured to be communicable with the host computer 2, the host computer 2 being configured to be communicable with the image forming apparatus. The user causes the document reading apparatus 500 to read the printing material P bearing the test image. The document reading apparatus 500 outputs the read-out image data to the host computer 2, and the host computer 2 outputs the read-out image data to the image forming apparatus. The image forming apparatus performs the aforementioned processes on the image data from the host computer 2 to determine the color and the component related to occurrence of an image defect.

Note that there may be a configuration in which the host computer 2 performs the aforementioned processes to determine the color and the component related to occurrence of an image defect, based on the image data from the document (or image) reading apparatus 500. In this case, the host computer 2 turns out to be an information processing apparatus that processes image data input from the document reading apparatus 500 to determine whether or not an image defect has occurred in the image formed by the image forming apparatus and, in a case where an image defect has occurred, determine the failed component. Furthermore, the document reading apparatus 500 may be configured to perform the aforementioned processes to determine the color and the component related to occurrence of the image defect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-077590, filed Apr. 24, 2020, which is hereby incorporated by reference herein in its entirety.

What is claimed is:

1. An image forming system comprising:
a plurality of image forming units corresponding to each of a plurality of colors and configured to form an image of a corresponding color;
a reading unit configured to read a test image formed on a printing material by the plurality of image forming units, the test image having a determination image formed by overlapping the plurality of colors and a plurality of reference images formed with each of a plurality of reference colors; and
a determination unit configured to determine a first color value in a predetermined color space of each of the plurality of reference colors based on a reading result of the plurality of reference images by the reading unit, determine a second color value in the predetermined color space of a plurality of pixels included in the determination image based on a reading result of the determination image by the reading unit, and determine whether or not an image defect has occurred based on an angle of a second vector corresponding to the second color value of the plurality of pixels with respect to a first vector corresponding to the first color value of each of the plurality of reference colors in the predetermined color space.

2. The image forming system according to claim 1, wherein the determination unit determines, for each of the plurality of reference colors, a change amount of an angle of the second vector with respect to the first vector, and determines whether or not the image defect has occurred based on the determined change amount.

3. The image forming system according to claim 2, wherein the determination unit determines, based on the reading result of the determination image by the reading unit, a first pixel with a highest density and a second pixel with a lowest density among the pixels included in the determination image, determines, for each of the plurality of reference colors, a first angle between the first vector and the second vector of the first pixel, determines a second angle between the first vector and the second vector of the second pixel, and sets a difference between the first angle and the second angle as the change amount of the angle.

4. The image forming system according to claim 2, wherein the determination unit determines that the image defect has occurred in a case where the change amount of the angle is larger than a threshold value for at least one reference color among the plurality of reference colors.

5. The image forming system according to claim 4, wherein the determination unit identifies an image forming unit related to occurrence of the image defect among the plurality of image forming units, in a case where the change amount of the angle for a first reference color among the plurality of reference colors is larger than the threshold value.

6. The image forming system according to claim 5, wherein
the plurality of reference colors are the plurality of colors, and
the determination unit determines that an image forming unit corresponding to the first reference color is related to occurrence of the image defect, in a case where the change amount of the angle for the first reference color is larger than the threshold value.

7. The image forming system according to claim 5, wherein
the plurality of colors and the plurality of reference colors respectively include three chromatic colors,
the three chromatic colors of the plurality of reference colors are subtractive mixed colors of two chromatic colors among the plurality of colors, and
the determination unit determines that an image forming unit corresponding to a chromatic color unused as the first reference color which is a chromatic color among the plurality of colors is related to occurrence of the image defect, in a case where the change amount of the angle for the first reference color is larger than the threshold value.

8. The image forming system according to claim 5, wherein
each of the plurality of image forming units includes a plurality of rotating bodies having different circumferential lengths, and
the determination unit identifies a rotating body related to occurrence of the image defect among the plurality of rotating bodies included in the image forming unit identified to be related to occurrence of then image defect, based on periodicity of the change of the angle between the first vector and the second vector, in a case where the change amount of the angle for the first reference color is larger than the threshold value.

9. The image forming system according to claim 8, wherein
the plurality of image forming units form the test image on the printing material to be conveyed in a conveyance direction; and
the length of the determination image in the conveyance direction is larger than the maximum value of the circumferential lengths of the plurality of rotating bodies.

10. The image forming system according to claim 8, wherein
each of the plurality of image forming units includes:
a photoconductor;
a charge roller configured to charge the photoconductor; and
a developing roller configured to develop a latent image formed on the photoconductor, and
the plurality of rotating bodies include the photoconductor, the charge roller, and the developing roller.

11. The image forming system according to claim 1, wherein
the reading unit further reads a background region of the printing material on which neither the plurality of reference images nor the determination image are formed on the printing material, and
the determination unit determines the first color value and the second color value so that a color value of the background region turns out to be an origin of the predetermined color space.

12. The image forming system according to claim 1, wherein
the plurality of image forming units and the determination unit are provided in an image forming apparatus, and
the reading unit is provided in an image reading apparatus communicable with the image forming apparatus.

13. The image forming system according to claim 1, wherein
the plurality of image forming units are provided in an image forming apparatus,
the reading unit is provided in an image reading apparatus, and
the determination unit is provided in an information processing apparatus communicable with the image reading apparatus.

14. An image forming apparatus comprising:
a plurality of image forming units corresponding to each of a plurality of colors and configured to form an image of a corresponding color;
a reading unit configured to read a test image formed on a printing material by the plurality of image forming units, the test image having a determination image formed by overlapping the plurality of colors and a plurality of reference images formed with each of a plurality of reference colors; and
a determination unit configured to determine a first color value in a predetermined color space of each of the plurality of reference colors based on a reading result of the plurality of reference images by the reading unit, determine a second color value in the predetermined color space of a plurality of pixels included in the determination image based on a reading result of the determination image by the reading unit, and determine whether or not an image defect has occurred based on an angle of a second vector corresponding to the second color value of the plurality of pixels with respect to a first vector corresponding to the first color value of each of the plurality of reference colors in the predetermined color space.

15. The image forming apparatus according to claim 14, wherein the reading unit reads the test image before the printing material bearing the test image is discharged to the outside of the image forming apparatus.

16. An information processing apparatus configured to be input image data of a test image formed on a printing material by an image forming apparatus using a plurality of colors, the image forming apparatus having a plurality of image forming units corresponding to each of the plurality of colors, wherein
the test image has a determination image formed by overlapping the plurality of colors, and a plurality of reference images formed with each of a plurality of reference colors, and
the information processing apparatus comprises a determination unit configured to determine a first color value in a predetermined color space of each of the plurality of reference colors based on the image data, determine a second color value in the predetermined color space of a plurality of pixels included in the determination image based on the image data, and determine whether or not an image defect has occurred in an image formed by the image forming apparatus, based on an angle of a second vector corresponding to the second color value of the plurality of pixels with respect to a first vector corresponding to the first color value of each of the plurality of reference colors in the predetermined color space.

17. A non-transitory computer-readable storage medium having one or more programs, wherein
the one or more programs, include instructions configured to, when executed by one or more processors of a computer, cause the computer to:
receive image data of a test image formed on a printing material by an image forming apparatus using a plurality of colors, the image forming apparatus having a plurality of image forming units corresponding to each of the plurality of colors, and the test image having a determination image formed by overlapping the plurality of colors, and a plurality of reference images formed with each of a plurality of reference colors;
determine a first color value in a predetermined color space of each of the plurality of reference colors based on the image data;
determine a second color value in the predetermined color space of a plurality of pixels included in the determination image based on the image data; and
determine whether or not an image defect has occurred in an image formed by the image forming apparatus, based on an angle of a second vector corresponding to the second color values of the plurality of pixels with respect to a first vector corresponding to the first color values in the predetermined color space of each of the plurality of reference colors.

* * * * *